Patented June 30, 1925.

1,544,104

UNITED STATES PATENT OFFICE.

ROBERT M. PETTIT, OF BALTIMORE, MARYLAND, ASSIGNOR TO COLLOIDAL SOAP PRODUCTS CORPORATION, OF DOVER, DELAWARE, A CORPORATION OF DELAWARE.

PROCESS OF MAKING SOAPS AND DETERGENTS.

No Drawing. Continuation of application Serial No. 752,124, filed November 25, 1924. This application filed February 27, 1925. Serial No. 12,173.

*To all whom it may concern:*

Be it known that I, ROBERT M. PETTIT, a citizen of the United States, residing in the city of Baltimore, in the State of Maryland, have invented new and useful Improvements in Processes of Making Soaps and Detergents, of which the following is a specification.

My invention relates to processes of making soaps and detergents from potatoes, or tubers of like character, and has for its object processes of making soaps and detergents which are simpler, more expeditious, considerably cheaper than those now in use, and which at the same time produce a superior product.

By my improved processes, I employ potatoes, which may be used in their raw unpeeled state, which I reduce to a fine pulp, preferably to at least 20 mesh, by any of the familiar processes, such as grating, grinding, mashing, etc. This potato pulp (for example, 400 pounds) is mixed with a quantity of caustic alkali, which for a high grade family soap may be a caustic solution of about 313 pounds of 37° Baumé, or partly solid and partly solution in substantially the proportions shown in the fourth example given below.

After the pulp and caustic have been thoroughly mixed, they are placed in a heated mixer (steam-jacketed mixer preferred), the mixer closed, and the mixture then subjected to heat at substantially 210° F. (which should be less than the heat of carbonization and preferably should not exceed 210° F.) for a period of ten to twenty minutes during which period it is agitated. As the mixture is in a closed mixer, all ingredients evolved from the chemical combinations and reaction of the contents are retained in the product, and this step in the operation I designate as a "sweating" process.

At the conclusion of this heating and sweating process I add soda ash, carbonate of soda, or potassium carbonate, or a substance of like character; I also add a fatty acid or an animal or vegetable oil, or a mixture thereof, that is a saponifiable oil (which, for convenience, I designate as a "fat" or as "fatty matter"). These may be added in the order mentioned or concurrently, or as convenient, and the mixing continued in a closed heated mixer, at substantially the same temperature as above, for a period of ten to twenty minutes. For a high grade family soap with 400 pounds of potato pulp I use approximately 150 pounds of soda ash, or its equivalent of sodium carbonate and approximately 250 pounds of fatty matter consisting of tallow and cocoanut oil or tallow and a vegetable oil, in approximately equal proportions. Any of the fatty acids commonly employed in soap making may be used, and if a fatty acid is used, in making a high grade family soap, with 400 pounds of potato pulp I use approximately 237 pounds of a fatty acid, which is approximately the equivalent of the saponifiable oils mentioned above.

The proportionate quantities of the different ingredients are somewhat dependent upon the quality of product desired. When a fatty acid alone is used, or when a fatty acid mixed with either a vegetable or an animal oil, or with a mixture of both, is used, the soda ash, or soda carbonate or potassium carbonate used (whichever is used in the final step) may be slightly increased to facilitate the operation, as will be understood by all familiar with soap making, it being understood that when a fatty acid alone is used or a fatty acid mixed with either a vegetable or an animal oil, or a mixture of both (such fatty acid or such mixture, for convenience, I designate as "fatty matter") the aggregate of such fatty matter should be substantially the total of the animal or vegetable oils, or the total of the two when both are used, shown in the examples following. In the examples following the caustic alkali and the caustic soda (or flake caustic) are mixed with the potato pulp, while the soda ash (or sodium carbonate or potassium carbonate) is combined with such mixture after the mixture has been subjected to the "sweating" process, all as is described above.

For a lesser expensive grade of soap, a good product is obtained by the use of the following proportions:

| | Pounds. |
|---|---|
| Potato pulp | 400 |
| Caustic alkali 37° Bé | 78 |
| Caustic soda, 76% | 25 |
| Soda ash, sodium carbonate or potassium carbonate | 400 |
| Cotton seed foots, or a vegetable oil | 100 | or—

| | Pounds. |
|---|---|
| Potato pulp | 400 |
| Caustic alkali 37° Bé | 78 |
| Caustic soda, 76% | 25 |
| Soda ash, sodium carbonate or potassium carbonate | 400 |
| ⅔ tallow and ⅓ oil, oil to be either cocoanut or cotton seed foots | 100 |

The above proportions may be varied within reasonable limits and a good product still obtained.

For a high grade laundry soap I have found the following proportions preferable:

| | Pounds. |
|---|---|
| Potato pulp | 250 |
| Caustic alkali 37° Bé | 63 |
| Caustic soda 76% | 65 |
| Soda ash, sodium carbonate or potassium carbonate | 150 |
| Cocoanut oil or a vegetable oil | 158 |
| Tallow | 317 |

For a high grade family soap I have found the following proportions preferable:

| | Pounds. |
|---|---|
| Potato pulp | 400 |
| Caustic alkali 37° Bé | 154 |
| Flake caustic 76% | 43 |
| Soda ash, sodium carbonate or potassium carbonate | 200 |
| Tallow | 125 |
| Cocoanut oil or a vegetable oil | 125 |

The above proportions may also be modified within considerable limits and still produce a high grade product.

In actual practice I have found that better results are obtained by using soda ash or soda carbonate in preference to potassium carbonate or other substances of similar character although, in the process herein described, potassium carbonate and other substances of a similar character are regarded as equivalents of soda ash or sodium carbonate.

I also have found that better results are obtained by using a mixture of animal fats or oils, such as tallow, or the like, and a vegetable oil such as cocoanut oil, cotton seed foots, or the like, in substantially the proportions shown in the above examples. The aggregate of such fatty matter to be used is substantially in the proportions above described.

If a fatty acid, or an animal oil, or a vegetable oil is used, or mixture thereof, the amount should be substantially the total of the fatty matter (that is, the saponifiable oil) indicated in the above examples.

This application is a continuation of my application filed November 25th, 1924, Serial No. 752,124. This application is a companion application with my application Serial No. 12,172, filed and pending concurrently herewith.

I claim:

1. The process of making soaps and detergents consisting of subjecting potato pulp mixed with a caustic alkali to a mixing in a closed mixer, at a heat of substantially 210° F., for a period of ten to twenty minutes, and then adding soda ash and a fatty acid, and subjecting this mixture to a mixing in a closed mixer, at substantially the same temperature as before, for a period of from ten to twenty minutes.

2. The process of making soaps and detergents consisting of subjecting 400 pounds of potato pulp mixed with substantially 313 pounds of caustic alkali at 37° Baumé to a mixing in a closed mixer, at a heat of substantially 210° F., for a period of ten to twenty minutes, and then adding approximately 200 pounds of soda ash and 237 pounds of a fatty acid, and subjecting this mixture to a mixing in a closed mixer, at substantially the same temperature as before, for a period of from ten to twenty minutes.

ROBERT M. PETTIT.

Witnesses:
MARTIN VAITH,
H. R. POHLER.